US008699372B2

(12) United States Patent
Guo

(10) Patent No.: US 8,699,372 B2
(45) Date of Patent: Apr. 15, 2014

(54) SYSTEM AND METHOD FOR IMPLEMENTING BEAM FORMING FOR A SINGLE USER

(75) Inventor: Yang Guo, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 240 days.

(21) Appl. No.: 13/320,362

(22) PCT Filed: Mar. 24, 2010

(86) PCT No.: PCT/CN2010/071257
§ 371 (c)(1),
(2), (4) Date: Nov. 14, 2011

(87) PCT Pub. No.: WO2010/130166
PCT Pub. Date: Nov. 18, 2010

(65) Prior Publication Data
US 2012/0063348 A1 Mar. 15, 2012

(30) Foreign Application Priority Data

May 14, 2009 (CN) .......................... 2009 1 0084457

(51) Int. Cl.
*H04J 1/16* (2006.01)
*H04W 4/00* (2009.01)
(52) U.S. Cl.
USPC ............................ 370/252; 370/328; 370/334
(58) Field of Classification Search
USPC ......................................... 370/252, 328, 334
See application file for complete search history.

(56) References Cited

U.S. PATENT DOCUMENTS

| 7,429,949 | B1 | 9/2008 | Trigui | |
|---|---|---|---|---|
| 2002/0090978 | A1* | 7/2002 | Petrus et al. | 455/562 |
| 2004/0179544 | A1* | 9/2004 | Wilson et al. | 370/442 |
| 2004/0235529 | A1* | 11/2004 | Tarokh et al. | 455/562.1 |

(Continued)

FOREIGN PATENT DOCUMENTS

| CN | 1582043 A | 2/2005 |
|---|---|---|
| CN | 1589054 A | 3/2005 |

(Continued)

OTHER PUBLICATIONS

International Search Report for PCT/CN2010/071257, English translation attached to Original, Both Completed by the Chinese Patent Office on May 5, 2010, All together 7 pages.
Michael A. Jensen et al., A Review of Antennas and Propagation for MIMO Wireless Communications, IEEE Transactions on Antennas and Propagation, vol. 52, No. 11, Nov. 2004, pp. 1-16.
3GPP TSG RAN WG1 Meeting #56bis—R1-091434, Considerations on Dual-Layer Beamforming, Mar. 23-27, 2009, pp. 1-4.

*Primary Examiner* — Andrew Lee
(74) *Attorney, Agent, or Firm* — Brooks Kushman P.C.

(57) ABSTRACT

The invention discloses a system for implementing beam forming for a single user is, in the system, a null widening calculation unit is for calculating the first beam forming weight corresponding to the first detection threshold and the second beam forming weight corresponding to the second detection threshold by using a null widening algorithm according to the input first detection threshold and second detection threshold; a beam forming unit is for implementing beam forming according to the first beam forming weight and second beam forming weight respectively. The invention further discloses a method for implementing beam forming for a single user, and the method includes: calculating the first beam forming weight corresponding to the first detection threshold and the second beam forming weight corresponding to the second detection threshold by using a null widening algorithm according to the input first detection threshold and second detection threshold; and implementing beam forming.

8 Claims, 2 Drawing Sheets

(56) References Cited

U.S. PATENT DOCUMENTS

| | | |
|---|---|---|
| 2005/0037799 A1 | 2/2005 | Braun et al. |
| 2008/0068266 A1* | 3/2008 | DeAgro ................. 342/424 |
| 2008/0170554 A1 | 7/2008 | Wang et al. |
| 2011/0299460 A1* | 12/2011 | Tarokh et al. ............. 370/328 |
| 2012/0027111 A1* | 2/2012 | Vook et al. ............... 375/267 |
| 2013/0045767 A1* | 2/2013 | Wilson et al. ............. 455/509 |

FOREIGN PATENT DOCUMENTS

| | | |
|---|---|---|
| CN | 1829119 A | 9/2006 |
| CN | 100355150 C | 12/2007 |
| CN | 101425832 A | 5/2009 |
| GB | 2332122 A | 9/1999 |

\* cited by examiner

SYSTEM AND METHOD FOR IMPLEMENTING BEAM FORMING FOR A SINGLE USER

CROSS-REFERENCE TO RELATED APPLICATION

This application is the U.S. national phase of PCT Appln. No. PCT/CN2010/071257 filed Mar. 24, 2010 which claims priority to Chinese Application No. 200910084457.4 filed May 14, 2009, the disclosures of which are incorporated in their entirety by reference herein.

TECHNICAL FIELD

The invention relates to intelligent antenna beam forming technique of the Multiple Input and Multiple Output (MIMO) wireless mobile communication system, and specifically, to a system and method for implementing beam forming for a single user based on a null widening algorithm in a Frequency Division Duplex (FDD) system.

BACKGROUND OF THE RELATED ART

The existing technique beam forming technique for a single user is a single stream beam forming technique, which comprises: sending one data stream to one user, and implementing beam forming. For the beam forming technique, the beam forming technique works mainly by controlling the direction of the beam, and is more appropriate for the scenario with the spacious suburb. As the beam forming technique can obtain the beam of the characteristic direction, therefore, using the beam forming technique can obtain an obvious beam energy gain, expand and improve the coverage of cells, decrease the interference of systems and increase the capability of systems, enhance the reliability of links, and enhance the peak rate; using the beam forming technique can also improve the performance of edge users efficiently.

After the MIMO technique to which people pay more attention in the research of the Long Term Evolution (LTE) appearing, as the channel capability can be increased efficiently by using the MIMO technique, therefore, along with the development of the LTE research, the new requirement is: implementing multi-stream beam forming technique by using the MIMO technique, extending the existing single stream beam forming technique to the multi-stream beam forming technique, and still being used for a single user, so as to implement beam forming for a single user much better. That is, the new requirement is that: a solution of multi-stream beam forming for a single user is needed; however, there is not an efficient solution for this new requirement yet at present.

SUMMARY OF THE INVENTION

In view of this, the main object of the invention is to provide a system and method for implementing beam forming for a single user, which can implement dual-stream beam forming for a single user.

To achieve the above object, the technical scheme of the invention is implemented like this:

a system for implementing beam forming for a single user, and the system comprises: a detection unit, a null widening calculation unit and a beam forming unit; wherein, the detection unit is for detecting an uplink signal intensity, and obtaining a first detection threshold and a second detection threshold; and inputting the first detection threshold and the second detection threshold into said null widening calculation unit;

the null widening calculation unit is for calculating a first beam forming weight corresponding to the first detection threshold and a second beam forming weight corresponding to the second detection threshold by using a null widening algorithm according to input the first detection thresholds and the second detection threshold;

the beam forming unit is for setting directions of beam forming respectively according to the first beam forming weight and the second beam forming weight and implementing downlink beam forming in a condition of sending two data streams at a same time for a same one user.

Wherein said first detection threshold specifically is a first direction of arrival DOA 1, and said second detection threshold specifically is a second direction of arrival DOA 2;

the detection unit is further for performing detection according to an uplink SRS, and obtaining the DOA 1 and the DOA 2;

said null widening calculation unit is further for calculating a first beam forming weight W1 corresponding to DOA 1 and a second beam forming weight W2 corresponding to DOA 2 according to the DOA 1 and the DOA 2, wherein a main direction of a beam corresponding to W1 is DOA 1, and a wide null is generated on DOA 2; a main direction of a beam corresponding to W2 is DOA 2, and a wide null on DOA 1.

The system further comprises: a reference signal addition unit, which is for obtaining the two data streams, adding a first layer dedicated reference signal DRS1 to a first data stream, adding a second layer dedicated reference signal DRS2 to a second data stream, and inputting the first data stream which is added DRS1 and the second data stream which is added DRS2 into the beam forming unit.

The beam forming unit is further for multiplying the first data stream which is added DRS1 with the W1 and mapping to an antenna, multiplying the second data stream which is added DRS2 with the W2 and mapping to the antenna; and sending two groups of signals after adding the two groups of signals which are mapped to the antenna to complete the downlink beam forming.

A method for implementing beam forming for a single user comprises:

a detection unit detecting an uplink signal intensity, and obtaining a first detection threshold and a second detection threshold; inputting the first detection threshold and the second detection threshold to a null widening calculation unit;

the null widening calculation unit calculating a first beam forming weight corresponding to the first detection threshold and a second beam forming weight corresponding to the second detection threshold by using a null widening algorithm according to input the first detection threshold and the second detection threshold;

a beam forming unit setting directions of beam forming according to the first beam forming weight and the second beam forming weight respectively and implementing downlink beam forming in a condition of sending two data streams at a same time for a same one user.

Wherein the first detection threshold specifically is DOA 1, the second detection threshold specifically is DOA 2; the detection unit performs detection according to an uplink SRS specifically, and obtain the DOA 1 and the DOA 2;

the null widening calculation unit calculates W1 corresponding to DOA 1 and W2 corresponding to DOA 2 according to the DOA 1 and the DOA 2 specifically; wherein a main direction of a beam corresponding to W1 is DOA 1, and a wide null is generated on DOA 2; a main direction of a beam corresponding to W2 is DOA 2, and a wide null is generated on DOA 1.

Before the beam forming unit implementing the downlink beam forming, the method further comprises: a reference signal addition unit obtaining the two data streams, adding DRS1 into a first data stream, and adding DRS2 into a second data stream.

The beam forming unit implementing the downlink beam forming specifically comprises:

multiplying the first data stream which is added DRS1 with the W1 and mapping to an antenna, multiplying the second data stream which is added DRS2 with the W2 and mapping to the antenna; and sending two groups of signals after adding the two groups of signals which are mapped to antenna to complete the downlink beam forming.

After implementing the downlink beam forming, the method further comprises: when user terminal demodulates a received added signal, using the DRS1 and the DRS2 to demodulate respectively.

A detection unit detects an uplink signal intensity and obtains a first detection threshold and a second detection threshold; inputs the first detection threshold and the second detection threshold to a null widening calculation unit; the null widening calculation unit calculates a first beam forming weight corresponding to the first detection threshold and a second beam forming weight corresponding to the second detection threshold by using a null widening algorithm according to input the first detection threshold and the second detection threshold; a beam forming unit sets directions of beam forming according to the first beam forming weight and the second beam forming weight respectively and implementing downlink beam forming in a condition of sending two data streams at a same time for a same one user.

Double The invention implements the dual-stream beam forming for a single user, sends two data streams for one user at the same time, and as the channel capability can be increased efficiently by using the MIMO technique, therefore, the throughput of the system and the throughput of the single user can be increased by using the invention. And the null widening algorithm is used to design the correspondingly suitable first beam forming weight and second beam forming weight respectively for the obtained uplink first detection threshold and second detection threshold, the direction of beam forming is designed by the designed first beam forming weight and second beam forming weight and downlink beam forming is implemented, so that at the same time when the dual-stream beam forming for a single user is implemented, the interference between two data streams can be efficiently reduced, wherein the beam forming weight can also be termed as the antenna transmission weight.

PREFERRED EMBODIMENTS OF THE INVENTION

The basic concept of the invention is: implementing dual-stream beam forming for a single user, sending two data stream for one user at the same time, and after detecting the uplink signal intensity and obtaining the first detection threshold and the second detection threshold, the null widening calculation unit calculating the first beam forming weight corresponding to the first detection threshold and the second beam forming weight corresponding to the second detection threshold by using the null widening algorithm according to the input first detection threshold and second detection threshold; the beam forming unit setting directions of beam forming according to the first beam forming weight and the second beam forming weight respectively and implementing downlink beam forming.

The implementation of the technical scheme is further described in detail with reference to the drawings below.

Figure 1:
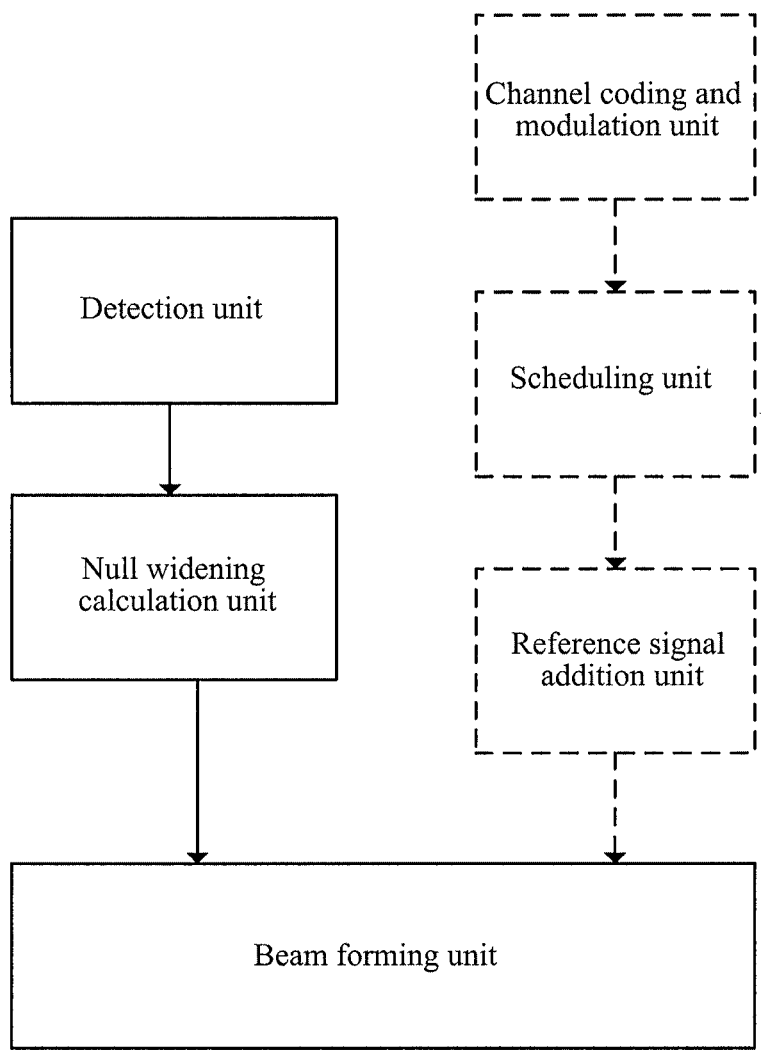
FIG. 1 is a schematic diagram of the constitution structure of the system according to the invention.

FIG. 1 shows a system for implementing beam forming for a single user, and the system comprises: a detection unit, a null widening calculation unit, and a beam forming unit, wherein the detection unit is for detecting an uplink signal intensity, and obtaining the first detection threshold and the second detection threshold; and inputting the first detection threshold and the second detection threshold into the null widening calculation unit. The null widening calculation unit is for calculating the first beam forming weight corresponding to the first detection threshold and the second beam forming weight corresponding to the second detection threshold by using a null widening algorithm according to the input first detection threshold and second detection threshold. The beam forming unit is for setting directions of beam forming according to the first beam forming weight and the second beam forming weight respectively and implementing downlink beam forming in the status of sending two data streams at the same time for the same one user.

It needs to be pointed out that the first detection threshold and the second detection threshold refer to: two maximum upper limit values obtained when the detection unit detects the uplink signal intensity, and the first detection threshold greater than the second detection threshold. The reason for using maximum upper limit values of two signal intensities as the input parameters of the null widening calculation unit is that the space channel where the user is situated is a complex space physical environment, scatterers will make the received signal consist of signals of a plurality of sub-paths, the interference of two sub-paths with maximum signal intensities is most obvious, and it needs to decrease this most obvious interference to implement the final beam forming better. Namely, estimating the directions of two sub-paths with maximum signal intensities is very important, as thus, maximum upper limit values of two signal intensities in the signal coverage are obtained; the two corresponding beam forming weights are calculated respectively by using the existing null widening algorithm according to maximum upper limit values of two signal intensities, then the beam forming implemented according to the two beam forming weights is better, and the interference is lower.

Herein, in the case that the first detection threshold specifically is the first direction of arrival (DOA 1) and the second detection threshold specifically is the second direction of arrival (DOA 2), the detection unit is further for performing the detection according to the uplink SRS and obtaining the DOA 1 and the DOA 2, wherein the SRS is the shortened form of the sounding reference signal, it is usually termed as the uplink sounding reference signal.

The null widening calculation unit is further for calculating the first beam forming weight (W1) corresponding to DOA 1 and the second beam forming weight (W2) corresponding to DOA 2 according to the DOA 1 and the DOA 2, wherein the main direction of the beam corresponding to W1 is DOA 1, and the wide null is generated on DOA 2 at the same time; the main direction of the beam corresponding to W2 is DOA 2, and the wide null is generated on DOA 1 at the same time.

Herein, the system further comprises: a channel coding and modulation unit, which is for performing the channel coding and modulation on the two input data streams. This channel coding and modulation unit further connects with a scheduling unit, the scheduling unit is used as a reserved unit, and can be used for performing various scheduling on two data streams after processing by channel coding and modulation. Herein, for example, the reason for reserving this scheduling unit is that: such as, when the base station determines the signal condition is not good and adaptive scheduling needs performing, and at this moment, only one data stream is received and is sent to the subsequent unit in the system; when the base station determines that the signal condition is improved and adaptive scheduling needs performing, and at this moment, two data streams can be received at the same time and be sent to the subsequent unit in the system.

The system further comprises a reference signal addition unit, the reference signal addition unit can connect with the reserved scheduling unit, and the reference signal addition unit is used for obtaining the two data streams, adding the first layer dedicated reference signal (DRS1) to the first data stream, adding the second layer dedicated reference signal (DRS2) to the second data stream, and inputting the first data stream which is added the DRS1 and the second data stream which is added the DRS2 into the beam forming unit. The beam forming unit is further for multiplying the first data stream which is added the DRS1 with the W1 and mapping to antenna, and multiplying the second data stream which is added the DRS2 with the W2 and mapping to antenna; sending two groups of signals which are mapped to antenna after adding the two groups to complete downlink beam forming.

Figure 2:
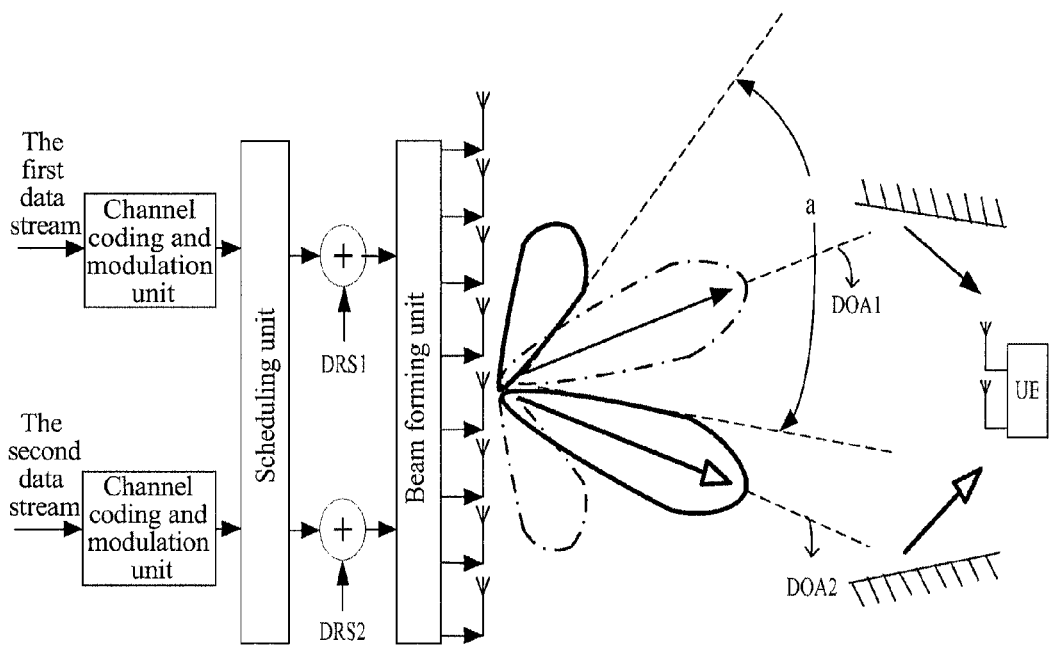
FIG. 2 is a schematic diagram of implementing dual-stream beam forming for a single user based on the null widening algorithm according to the invention.

FIG. 2 shows a schematic diagram of implementing dual stream beam forming for a single user based on the null widening algorithm of the invention, FIG. 2 only relates to various units for completing downlink beam forming in the system, but does not comprise the units for implementing the uplink detection and calculating the beam forming weight, and the system comprises the channel coding and modulation unit and the reserved scheduling unit, ⊕ in the figure represents the reference signal addition unit, and a represents the wide null generated on DOA 1 by the main direction of DOA 2 of the beam corresponding to W2. It can be seen directly from FIG. 2 that: two data streams respectively add respective dedicated reference signals DRS1 and DRS2 by the reference signal addition unit after being processed by the channel coding and modulation unit and the scheduling unit; the beam forming unit sets the directions of beam forming by respective beam forming weights W1 and W2, multiplies the first data stream which is added DRS1 with the W1 and mapping to antenna, and multiplies the second data stream which is added DRS2 with the W2 and mapping to antenna; and sends two groups of signals after adding two groups of signals which are mapped to antenna to complete downlink beam forming.

Wherein, the main direction of the beam corresponding to W1 which is calculated by using the null widening algorithm is DOA 1, at the same time the wide null is generated on DOA 2, herein, DOA 1 is a main lobe direction of the first beam, the specific shape of the beam on this main lobe direction is represented by a dash dotted line, and the specific shape of the beam on a corresponding side lobe direction is still represented by the dash dotted line. The main direction of the beam corresponding to W2 which is calculated by using the null widening algorithm is DOA 2, at the same time the wide null is generated on DOA 1, herein, DOA 2 is a main lobe direction of the second beam, the specific shape of the beam on this main lobe direction is represented by the thick solid line, and the specific shape of the beam on a corresponding side lobe direction is still represented by the thick solid line. It can be seen directly from FIG. 2 that: as the main direction of the beam corresponding to W2 which is calculated by using the null widening algorithm is DOA 2, at the same time the wide null is generated on DOA 1, therefore, the signal in the side lobe direction of the second beam will not interfere with the signal in the main lobe direction of the first beam. As thus, the interference between the beams is avoided by using the invention.

Figure 3:
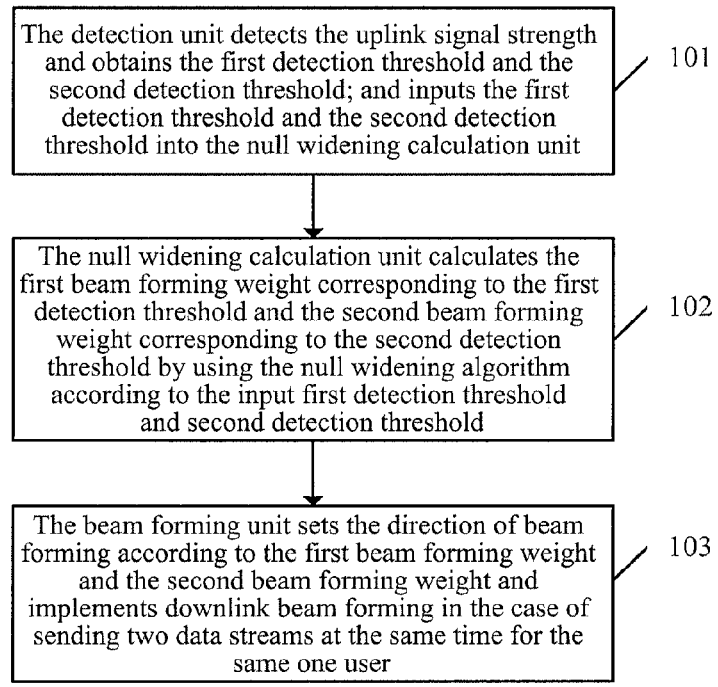
FIG. 3 is a schematic diagram of the flow of implementing the method according to the invention.

FIG. 3 shows a method for implementing beam forming for a single user, and the method comprises the following steps of:

step 101, the detection unit detects the uplink signal intensity, and obtains the first detection threshold and the second detection threshold; and inputs the first detection threshold and the second detection threshold to the null widening calculation unit.

Step 102, the null widening calculation unit calculates the first beam forming weight corresponding to the first detection threshold and the second beam forming weight corresponding to the second detection threshold by using the null widening algorithm according to the input first detection thresholds and second detection thresholds.

Step 103, the beam forming unit sets directions of beam forming according to the first beam forming weight and the second beam forming weight respectively and implements downlink beam forming in the case of sending two data streams to the same one user at the same time.

For the technical scheme comprising above step 101~step 103, when the first detection threshold specifically is DOA 1, the second detection threshold specifically is DOA 2, and in step 101, the detection unit performs the detection according to the uplink SRS specifically and obtains DOA 1 and DOA 2.

In step 102, the null widening calculation unit calculates W1 corresponding to DOA 1 and W2 corresponding to DOA 2 according to DOA 1 and DOA 2 specifically.

Wherein, the main direction of the beam corresponding to W1 is DOA 1, and the wide null is generated on DOA 2 at the same time; the main direction of beam corresponding to W2 is DOA 2, and the wide null is generated on DOA 1 at the same time.

In step 103, before the beam forming unit implementing the downlink beam forming, it further comprises: the reference signal addition unit obtaining the two data streams, adding DRS1 into the first data stream, and adding DRS2 into the second data stream.

Herein, in step 103, the beam forming unit implements the downlink beam forming specifically comprises: multiplying the first data stream which is added DRS1 with the W1 and mapping to antenna, multiplying the second data stream which is added DRS2 with the W2 and mapping to antenna; and sending two groups of signals after adding the two groups of signals which are mapped to the antenna to complete downlink beam forming.

Herein, in step 103, after implementing the downlink beam forming, it further comprises: when user terminal (UE) demodulates the received added signal, using the DRS1 and DRS2 to demodulate respectively. It needs to be pointed out that: as DRS1 and DRS2 actually occupy the resources of data, DRS1 and DRS2 are loaded in the data stream, but are not in antenna interface, therefore, the equivalent channel can be estimated by using DRS1 and DRS2, namely, the system with 8×2 antenna configuration, when the receiving end performs channel estimation by using DRS1 and DRS2, the dimension of the estimated equivalent channel is 1×2, and this equivalent channel is used to perform the respective demodulation of the receiving end.

It needs to be pointed out that: the invention can be applied in the LTE+ system, the LTE+ system is the system which uses the FDD mode, as the uplink channel and the downlink channel are situated at different frequency bands in the system which uses the FDD mode, it can not directly obtain downlink channel information by the uplink channel information, which is disadvantageous for using channel matrix information and obtaining the beam forming weight by performing the eigenvalue decomposition on the channel matrix so as to implement beam forming, thus the invention calculates the first beam forming weight corresponding to the first detection threshold and the second beam forming weight corresponding to the second detection threshold by using the null widening algorithm to implement beam forming, and at the same time the interference can be decreased efficiently.

In conclusion, the invention mainly comprises the contents of the following aspects:

firstly, evolved nodes (eNB, eNodeB) can estimate the DOA angle of users according to the uplink SRS, the DOA herein are two estimated largest direction angles of the uplink signal power which are from the user, and these two DOA angles are marked as DOA1 and DOA2, wherein DOA1 is the largest direction angle of the signal power.

Secondly, DOA1 and DOA2 are taken as input parameters, and the expected two groups of beam forming weights W1 and W2 on two directions can be respectively obtained by using the null widening algorithm, wherein the main direction of the beam corresponding to W1 is DOA 1, and the wide null is generated on DOA 2 at the same time; the main direction of the beam corresponding to W2 is DOA 2, and the wide null is generated on DOA 1 at the same time; so that the interference among the users can be reduced.

Thirdly, the invention is appropriated for the LTE+ system, the beam forming technique for dual-stream single user of the invention needs to use the dual-layer dedicated reference signal (DRS), which are marked as DRS1 and DRS2 respectively. The eNB will send two data streams at the same time to the same one user, and adds DRS1 into the first data stream; and adds DRS2 into the second data stream.

Fourthly, the first data stream which is added DRS1 is multiplied with W1 and is mapped into the antenna, the second data stream which is added DRS2 is multiplied with W2 and is mapped to the antenna, and two groups of signals are added at the port of the antenna. Two groups of signals are sent by the antenna to complete the downlink forming process.

Fifthly, UE of the receiving end demodulates signals according to the DRS1 and DRS2.

The invention further relates to the method for feeding back signaling and the content of the format definition, as shown in following: the relationship between this part of the content and the invention is that: when using the above operation of the content of the invention, it defines the following specific points of use at the same time:

firstly, in the LTE+ system, the invention does not need the Precoding Matrix Index (PMI) feedback, the saved feedback space can be used for the transmission of other signaling when defining a new Downlink control Index (DCI) mode, and the PMI feedback space also can be cancelled.

Secondly, the interference among users are influenced by the matching situation and the used precoding vector, the estimation method of the Channel Quality Indicator (CQI) in the situation of the FDD can use the method that the estimation is based on CQIs of all the common reference signal and UE performs the feedback. The eNB can adjust and modify the CQI which is reported by UE according to the interference situation among the data streams.

Thirdly, the estimation method of the Rank of the channel matrix: in the situation of the FDD, as the estimation of the CQI uses the common reference signal to obtain the channel, thus the Rank Index (RI) of the channel matrix needs the UE to perform the estimation, and perform the feedback to the eNB.

Fourthly, the dual layer dedicated reference signal should be used.

The following is the description of the null widening algorithm in the prior art.

It is assumed that the incident angle of the interference is $\theta_1$, in the situation of the data mismatch, the maximum variation of the angle is $\Delta\theta$, considering as two points distribution, the left disturbance of the incident angle is $p\Delta\theta$, the right disturbance of the incident angle is $q\Delta\theta$, and $p+q=1$. As the size of interference power only influences the depth of the null, it can be assumed that the powers of two interferences are the same. Thus, the two steering vectors formed by the interferences are:

$$a(\theta_1+p\Delta\theta)=[1,\exp(j\phi_1),\Lambda,\exp(j(M-1)\phi_1)]^T \quad (1)$$

$$a(\theta_1-q\Delta\theta)=[1,\exp(j\phi_2),\Lambda,\exp(j(M-1)\phi_2)]^T \quad (2)$$

In the formula 1 and formula 2, $\phi_1=\pi \sin(\theta_1+p\Delta\theta)$, and $\phi_2=\pi \sin(\theta_1-q\Delta\theta)$. If $\Delta\theta$ is very small, then:

$$\phi_1=\pi \sin(\theta_1+p\Delta\theta)\approx\pi(\sin \theta_1+p\Delta\theta \cos \theta_1) \quad (3)$$

$$\phi_2=\pi \sin(\theta_1-q\Delta\theta)\approx\pi(\sin \theta_1-q\Delta\theta \cos \theta_1) \quad (4)$$

The formula 3 and formula 4 are substituted into the formula 1 and formula 2, and it can be seen that $|\cos \theta_1|\leq 1$ for the fixed incident angle, considering the maximum angle spread, herein $|\cos \theta_1|=1$ is taken, and thus $\Delta\phi\approx\Delta\theta$ is set. Thus, the formula 1 and formula 2 can be changed into:

$$a(\theta_1+p\Delta\theta)=[1,\exp(j\phi)\exp(jp\Delta\phi),\Lambda,\exp(j(M-1)\phi)\exp(j(M-1)p\Delta\phi)]^T=Ba(\theta_1) \quad (5)$$

$$a(\theta_1-q\Delta\theta)=[1,\exp(j\phi)\exp(-jq\Delta\phi),\Lambda,\exp(j(M-1)\phi)\exp(-j(M-1)q\Delta\phi)]^T=C^H a(\theta_1) \quad (6)$$

In formula 5 and formula 6, $\phi=\pi \sin \theta_i$, and there are:

$$B=\mathrm{diag}\{1,\exp(jp\Delta\phi),\Lambda,\exp(j(M-1)p\Delta\phi)\} \quad (7)$$

$$C=\mathrm{diag}\{1,\exp(jq\Delta\phi),\Lambda,\exp(j(M-1)q\Delta\phi)\} \quad (8)$$

Thus, the expressions of received signals are:

$$X_+(t)=BAS(t)+Bn(t) \quad (9)$$

$$X_-(t)=C^H AS(t)+C^H n(t) \quad (10)$$

wherein the $X_+(t)$ represents the interference which is incident from $\theta_1+p\Delta\theta$, and $X_-(t)$ represents the interference which is incident from $\theta_1-q\Delta\theta$. The covariance matrixes formed by two signals are taken respectively, and as $BB^H=1$ and $CC^H=1$, so there are:

$$R^+=E[X_+(t)X_+^H(t)]=BAPA^H B^H+\sigma^2 I \quad (11)$$

$$R^-=E[X_-(t)X_-^H(t)]=C^H APA^H C+\sigma^2 I \quad (12)$$

As the formula 11 and formula 12 are the covariance matrixes obtained on the basis of dividing the signal into two parts, the arithmetic mean should be performed on two matrixes when calculating, and thus the obtained covariance matrix is:

$$R = \frac{1}{2}(R^+ + R^-) = \frac{1}{2}(BAPA^H B^H + C^H APA^H C) + \sigma^2 I. \quad (13)$$

It can seen from the formula 13 that as the matrix B and matrix C do not have information of the incident angle, and the finally obtained covariance matrix is the arithmetic operation of the covariance matrix of the received signal. The probability of the disturbance $\Delta\theta$ is p, the probability of $-\Delta\theta$ takes 1−p, and thus the mean value of the disturbance is:

$$m = (2p-1)\Delta\theta \quad (14)$$

The differences of mean values represents the differences of the central positions of the disturbance, and obviously, when p=0.5, the disturbance center is in the direction of the incident angle. The variance of the disturbance $\Sigma^2$ is:

$$\Sigma^2 = 4\Delta\theta^2 p(1-p) \quad (15)$$

As a metric of the disturbance and the deviation of the central angle, the lager the variance is, the larger the influence on the disturbance is represented. When p=0.5, it reaches the maximum. Due to the disturbance, $\Sigma^2$ represents the rejection for the disturbance, thereby influencing the signal interference to noise ratio of the received signal.

It can be seen by observing the formula 7 and formula 8 that when p=0.5, B=C, and as B and C are both diagonal matrixes taking the exponential function as the eigenvalue. It is consumed that the elements in $\hat{R}$ are $\hat{r}_{ij}$ (1≤i, j≤M). Then, the elements $\hat{r}_{ij}$ after performing the $B\hat{R}B^H$ operation are:

$$\hat{r}_{ij} \exp((i-j)\Delta\varphi/2) \quad (16)$$

And elements after performing the $C^H \hat{R} C$ operation are:

$$\hat{r}_{ij} \exp((j-i)\Delta\varphi/2) \quad (17)$$

The elements corresponding to the matrix can be taken the mean after performing the operation of the formula 13, and thus the elements corresponding to the matrix R are:

$$r_{ij} = \frac{1}{2}\hat{r}_{ij}\cos((i-j)\Delta\varphi/2) \quad (18)$$

It can seen from the formula 18 that the obtained matrix after performing the operation of the formula 13 is the operation of elements corresponding to the covariance matrix of the received signal, the matrix T is defined, and the elements thereinto are:

$$t_{ij} = \cos((i-j)\Delta\varphi/2) \quad (19)$$

And the operation as the formula 20 is performed on the matrix $\hat{R}$:

$$R = \hat{R} o T \quad (20)$$

Wherein, 0 is the Hadamard product. The matrix obtained by such operation and the matrix obtained by the formula 13 are the same, but the computational amount can be decreased.

The obtained R is substituted into a linear constraint minimum variance algorithm, namely the LCMV criteria formula, $\overline{w} = R_{xx}^{-1}\overline{a}(\theta_d)[\overline{a}^H(\theta_d)R_{xx}^{-1}\overline{a}(\theta_d)]^{-1}g$ to obtain the weight coefficient of the array, thereby completing the beam forming algorithm.

It needs to be pointed out herein that the invention will use this algorithm twice when using the above existing null widening algorithm. Specifically, when the null widening algorithm is used at the first time, DOA1 acts as the expected direction and DOA2 acts as the interference direction to obtain the first beam forming weight which is suitable for the use of user 1; when the null widening algorithm is used at the second time, DOA2 acts as the desired direction and DOA1 acts as the interference direction to obtain the second beam forming weight which is suitable for the use of user 2, wherein, $\theta_1$ in the null widening algorithm represents the interference direction, and $\theta_d$ in the formula $\overline{w} = R_{xx}^{-1}\overline{a}(\theta_d) [\overline{a}^H(\theta_d)R_{xx}^{-1}\overline{a}(\theta_d)]^{-1}g$ represents the expected direction.

What is said above is only the preferable examples of the invention, and is not used for limiting the protection scope of the invention.

What we claim is:

1. A system for implementing beam forming for a single user, and this system comprising: a detection unit, a null widening calculation unit and a beam forming unit; wherein, the detection unit is for detecting an uplink signal intensity, and obtaining a first detection threshold and a second detection threshold; and inputting the first detection threshold and the second detection threshold into said null widening calculation unit;

the null widening calculation unit is for calculating a first beam forming weight corresponding to the first detection threshold and a second beam forming weight corresponding to the second detection threshold by using a null widening algorithm according to input the first detection thresholds and the second detection threshold;

the beam forming unit is for setting directions of beam forming respectively according to the first beam forming weight and the second beam forming weight and implementing downlink beam forming in a condition of sending two data streams at a same time for a same one user;

wherein said first detection threshold specifically is a first direction of arrival DOA 1, and said second detection threshold specifically is a second direction of arrival DOA 2;

the detection unit is further for performing detection according to an uplink SRS, and obtaining the DOA 1 and the DOA 2;

said null widening calculation unit is further for calculating a first beam forming weight W1 corresponding to DOA 1 and a second beam forming weight W2 corresponding to DOA 2 according to the DOA 1 and the DOA 2, wherein a main direction of a beam corresponding to W1 is DOA 1, and a wide null is generated on DOA 2; a main direction of a beam corresponding to W2 is DOA 2, and a wide null on DOA 1.

2. The system according to claim 1, the system further comprising: a reference signal addition unit, which is for obtaining the two data streams, adding a first layer dedicated reference signal DRS1 to a first data stream, adding a second layer dedicated reference signal DRS2 to a second data stream, and inputting the first data stream which is added DRS1 and the second data stream which is added DRS2 into the beam forming unit.

3. The system according to claim 2, wherein the beam forming unit is further for multiplying the first data stream which is added DRS1 with the W1 and mapping to an antenna, multiplying the second data stream which is added DRS2 with the W2 and mapping to the antenna; and sending two groups of signals after adding the two groups of signals which are mapped to the antenna to complete the downlink beam forming.

4. A method for implementing beam forming for a single user, the method comprising:

detecting, by a detection unit, an uplink signal intensity, and obtaining, by the detection unit, a first detection threshold and a second detection threshold; inputting, by the detection unit, the first detection threshold and the second detection threshold to a null widening calculation unit;

calculating, by the null widening calculation unit, a first beam forming weight corresponding to the first detection threshold and a second beam forming weight corresponding to the second detection threshold by using a null widening algorithm according to input the first detection threshold and the second detection threshold;

setting, by a beam forming unit, directions of beam forming according to the first beam forming weight and the second beam forming weight respectively and implementing downlink beam forming in a condition of sending two data streams at a same time for a same one user;

wherein the first detection threshold specifically is DOA 1, the second detection threshold specifically is DOA 2; the detection unit performs detection according to an uplink SRS specifically, and obtain the DOA 1 and the DOA 2;

the null widening calculation unit calculates W1 corresponding to DOA 1 and W2 corresponding to DOA 2 according to the DOA 1 and the DOA 2 specifically; wherein a main direction of a beam corresponding to W1 is DOA 1, and a wide null is generated on DOA 2; a main direction of a beam corresponding to W2 is DOA 2, and a wide null is generated on DOA 1.

5. The method according to claim 4, before the beam forming unit implementing the downlink beam forming, the method further comprising:

obtaining, by a reference signal addition unit, the two data streams, adding DRS1 into a first data stream, and adding DRS2 into a second data stream.

6. The method according to claim 5, wherein the beam forming unit implementing the downlink beam forming specifically comprises:

multiplying the first data stream which is added DRS1 with the W1 and mapping to an antenna, multiplying the second data stream which is added DRS2 with the W2 and mapping to the antenna; and sending two groups of signals after adding the two groups of signals which are mapped to antenna to complete the downlink beam forming.

7. The method according to claim 5, after implementing the downlink beam forming, the method further comprising:

when user terminal demodulates a received added signal, using the DRS1 and the DRS2 to demodulate respectively.

8. The method according to claim 6, after implementing the downlink beam forming, the method further comprising:

when user terminal demodulates a received added signal, using the DRS1 and the DRS2 to demodulate respectively.

\* \* \* \* \*